United States Patent
Fujii et al.

[11] Patent Number: 5,172,788
[45] Date of Patent: * Dec. 22, 1992

[54] MOTORCYCLE

[75] Inventors: Takayuki Fujii, Saitama; Yoshio Nogami, Okayama; Yoshihiro Matsuo; Seiichi Urashi, both of Saitama, all of Japan

[73] Assignee: Honda Giken Kogyo Kabushiki Kaisha, Tokyo, Japan

[*] Notice: The portion of the term of this patent subsequent to Aug. 20, 2008 has been disclaimed.

[21] Appl. No.: 640,949

[22] Filed: Jan. 14, 1991

Related U.S. Application Data

[63] Continuation of Ser. No. 215,570, Jul. 6, 1988, Pat. No. 5,040,632.

[30] Foreign Application Priority Data

Jul. 6, 1987 [JP] Japan .................... 62-169322
Jul. 23, 1987 [JP] Japan .................... 62-184222

[51] Int. Cl.$^5$ ............................................ B62J 11/00
[52] U.S. Cl. .................................. 180/219; 180/68.3; 280/202
[58] Field of Search ............... 180/219, 227, 68.5; 280/288.4, 202; 224/32 R; 296/37.1, 37.15, 65.1

[56] References Cited

U.S. PATENT DOCUMENTS

| | | | |
|---|---|---|---|
| 4,700,799 | 10/1987 | Kawano | 180/219 |
| 4,723,620 | 2/1988 | Ono | 180/219 |
| 4,815,555 | 3/1989 | Kishi | 180/219 |
| 4,817,749 | 4/1989 | Montano | 280/202 |
| 5,040,632 | 8/1991 | Fujii et al. | 280/202 |

FOREIGN PATENT DOCUMENTS

42472 7/1933 France .................... 180/219

*Primary Examiner*—David M. Mitchell
*Attorney, Agent, or Firm*—Irving M. Weiner; Joseph P. Carrier; Pamela S. Burt

[57] ABSTRACT

A motorcycle has a fuel tank disposed near the front end of a motor cycle body frame and positioned substantially upwardly of the body frame, a rider's seat disposed rearwardly of the fuel tank, and an engine disposed downwardly of the body frame. A receptacle for storing a crash helment, for example, is disposed rearwardly of the fuel tank, forwardly of the rider's seat, and upwardly of the engine. The receptacle is openable and closably by at least a portion of the rider's seat which is movable back and forth or pivotally movable about an end thereof.

18 Claims, 10 Drawing Sheets

MOTORCYCLE

This is a continuation of application Ser. No. 07/215,570 filed Jul. 6, 1988, now U.S. Pat. No. 5,040,632.

BACKGROUND OF THE INVENTION

1. Field of the Invention

The present invention relates to a motorcyle, and more particularly to a motorcycle having a helmet storage box in its body.

2. Description of the Relevant Art

Japanese Laid-Open Utility Model Publication No. 59-192481 discloses a motorcycle having a large-size storage box or receptacle disposed in the motorcycle body. The motorcycle has an engine supported beneath a body frame extending rearwardly from a head pipe, and a fuel tank disposed below a rider's seat. The storage box is positioned above the body frame, is suitable for storing a helmet, and has an upper opening and a cover for the opening.

In the disclosed motorcycle, the upper space above the body frame, except for a dead space near the head pipe, is occupied by the storage box, and hence space availability above the body frame is limited. In addition, the layout of the engine and accessories is limited in order to avoid physical interference with the storage box.

SUMMARY OF THE INVENTION

According to the present invention, there is provided a motorcycle including a longitudinally extending body frame supporting front and rear wheels on front and rear ends, respectively, thereof, a fuel tank disposed near the front end of the body frame and positioned substantially upwardly of the body frame, a rider's seat disposed rearwardly of the fuel tank, an engine disposed downwardly of the body frame, and a receptacle disposed rearwardly of the fuel tank, forwardly of the rider's seat, and upwardly of the engine, the receptacle being openable and closable by at least a portion of the rider's seat.

The receptacle according to the present invention, which is of a large size, is mounted on the motorcycle by effectively and efficiently utilizing space available on the motorcycle, and so that the engine, the fuel tank, an air intake device or air cleaner, and the rider's seat can be arranged or laid out with increased freedom.

Since the receptacle can be opened and closed by moving the rider's seat, the appearance of the motorcycle is improved.

The above and further objects, details and advantages of the present invention will become apparent from the following detailed description of preferred embodiments thereof, when read in conjunction with the accompanying drawings.

DESCRIPTION OF THE PREFERRED EMBODIMENTS

Figure 1:
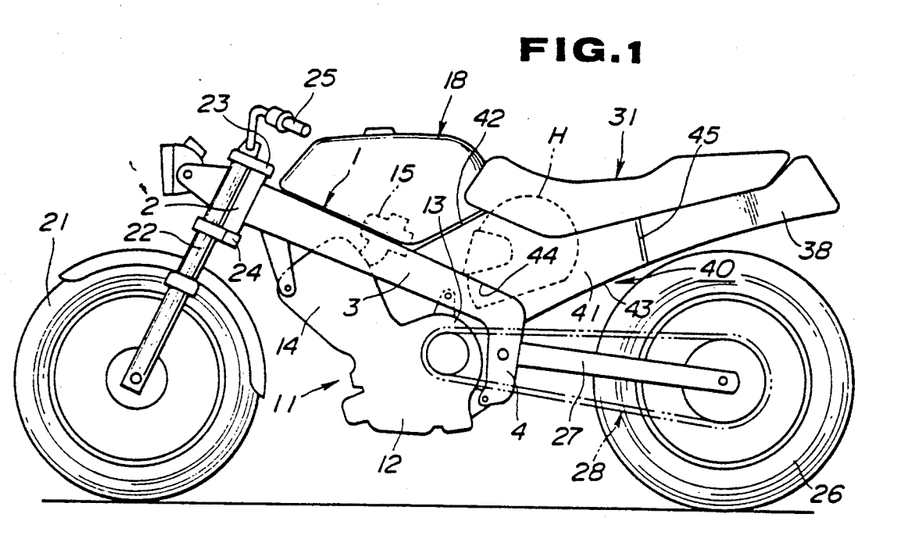
FIG. 1 is a schematic side elevational view of a motorcycle according to a first embodiment of the present invention.

As shown in FIG. 1, a motorcycle has a body frame 1 comprising a head pipe 2, a pair of main pipes 3 of rectangular cross-section extending rearwardly from the head pipe 2, and a pair of central pipes 4 extending downwardly from the rear ends of the main pipes 3. The head pipe 2 is fixed to the front ends of the main pipes 3. A front wheel 21 is rotatably supported by a front fork 22 on its lower end, which is steerably supported on the head pipe 2 by upper and lower bridges 23, 24 and a steering stem (not shown). A handlebar 25 is mounted on the upper end of the front fork 22. A rear swing arm 27 on which a rear wheel 26 is rotatably mounted is swingably supported between the central pipes 4.

An engine 11 has a forwardly inclined cylinder 14 mounted on a front portion of a crankcase 12 including a transmission case 13 in its rear portion. The engine 11 is suspended from the main pipes 3 and the central pipes 4. A drive transmission mechanism 28 which comprises a chain-and-sprocket mechanism in the illustrated embodiment is operatively coupled between one side of the transmission case 13 and the rear wheel 26. A carburetor 15 is connected to an upper portion of the cylinder 14 and has an upper end coupled to an air cleaner 16 (FIG. 2) disposed in a central recess 18b defined in the bottom wall 18a of a fuel tank 18 located above the front portions of the main pipes 3. A rider's seat 31 which is angularly movable about a pivot shaft 35 between lifted and lowered positions is disposed rearwardly of the fuel tank 18. A rear cowl 38 is located beneath a rear portion of the rider's seat 31.

A large-size receptacle 40 comprising a crash helmet storage box is disposed above the transmission case 13 of the engine 11, rearwardly and downwardly of the fuel tank 18, and forwardly and downwardly of the rider's seat 31. An upper opening of the helmet storage box 40 is covered by the seat 31, and can be opened and closed by lifting and lowering the seat 31.

Figure 3:
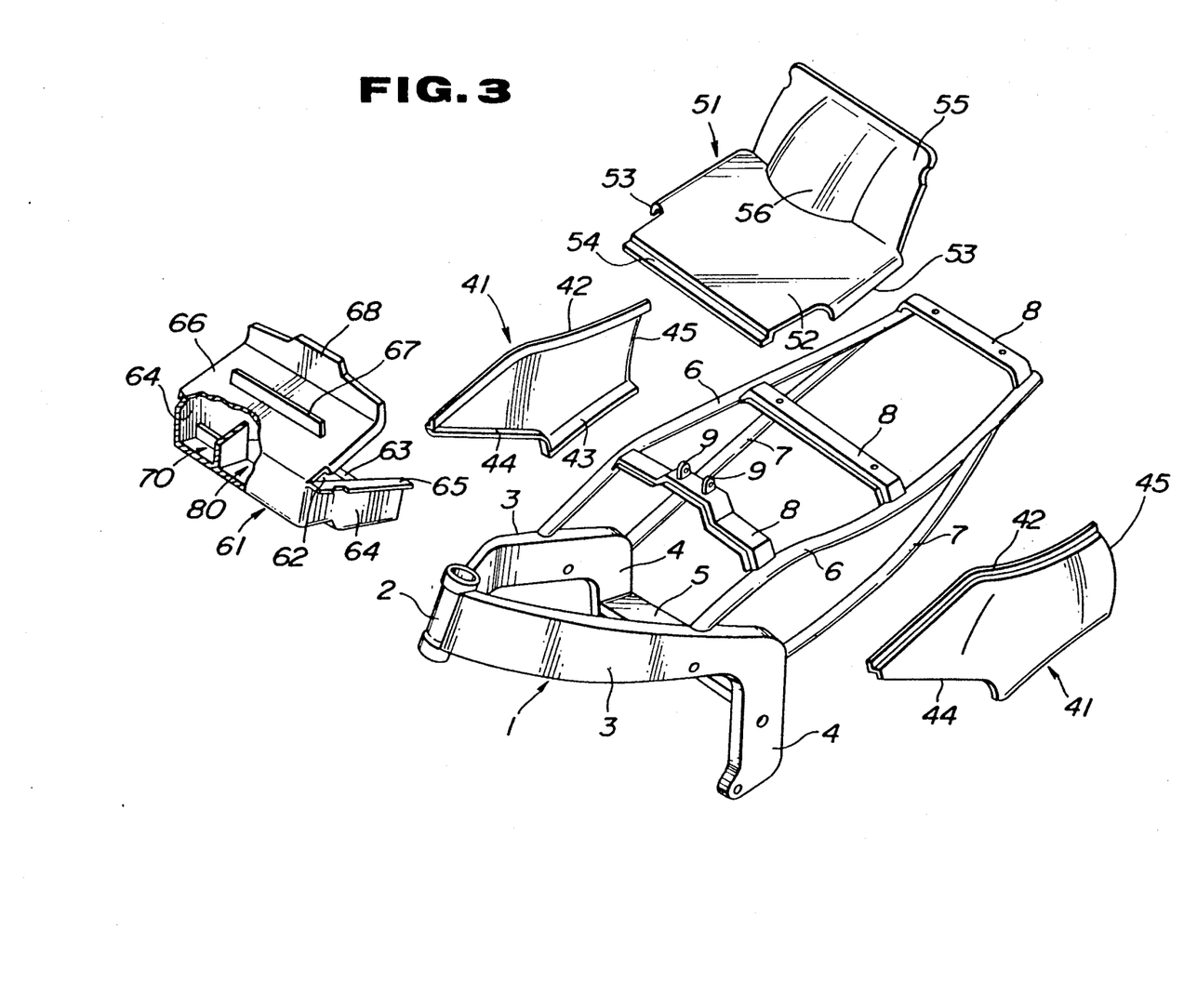
FIG. 3 is an exploded perspective view of a body frame and a helmet storage box or receptacle.
Figure 4:
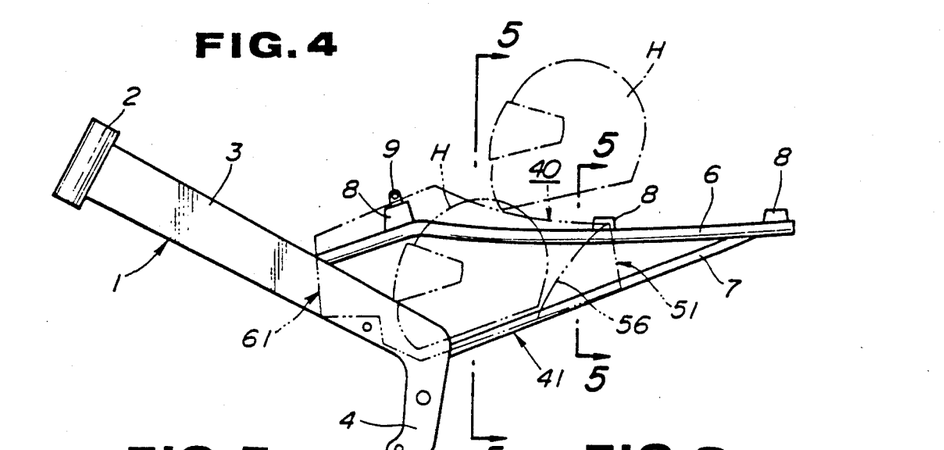
FIG. 4 is a side elevational view of the body frame.

As illustrated in FIG. 3, the body frame 1 is constructed as a piping frame in its entirety including a cross pipe 5 extending transversely between the central pipes 4, a pair of seat pipes 6 fixed to and extending rearwardly from the main pipes 3, a pair of subpipes 7 joined between upper portions of the central pipes 4 and rear portions of the seat pipes 6, and a plurality of cross plates 8 extending transversely between front, central, and rear portions of the seat pipes 6. A pair of seat support members 9 is vertically mounted on the front cross plate 8. As will be understood from FIGS. 1 and 3, the body frame 1 extends longitudinally of the motorcycle in a straight manner.

Figure 2:
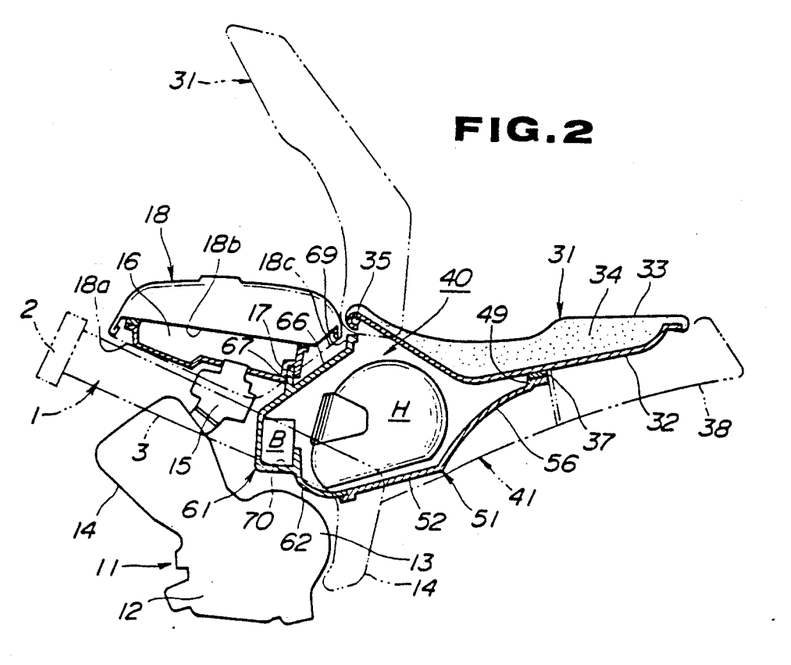
FIG. 2 is a schematic side elevational view, partly in cross section of a portion of the motorcycle shown in FIG. 1.

The rider's seat 31 comprises a cushioning member 34 interposed between a bottom plate 32 and a covering 33, as shown in FIG. 2. The front end of the bottom plate 32 is coupled to the seat support members 9 by the pivot shaft 35. Thus, the seat 31 is pivotally supported at its front end on the body frame 1.

The seat bottom plate 32 includes a front portion serving as the cover of the receptacle or helmet storage box 40. As can be understood from FIGS. 2 and 3, the helmet storage box 40 comprises a pair of transversely spaced side covers 41, a rear member 51, and a front member 61. All of these components of the helmet storage box 40 are preferably made of synthetic resin.

Figure 5:
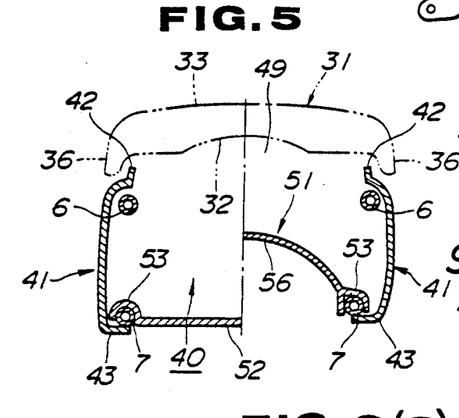
FIG. 5 is a cross-sectional view taken along line 5—5 and line 5'—5' of FIG. 4.

As shown in FIGS. 1-3, each of the side covers 41 has an upper edge 42 extending adjacent to a rear wall 18c of the fuel tank 18 and the bottom plate 32 of the seat 31, a lower edge 43 facing the lower surface of one of the subpipes 7, a front edge 44 extending adjacent to an upper rear surface of one of the main pipes 3 and an upper rear surface of one of the central pipes 4, and a rear edge 45 extending adjacent to a front portion of the rear cowl 38. As shown in FIG. 5, the upper edges 42 of the side covers 41 are bent inwardly of downwardly extending side portions 36 of the seat 31 above the respective seat pipes 6. The lower edges 43 of the side covers 41 cover the lower surfaces of the subpipes 7. In FIGS. 2 and 3, the rear member 51 of the helmet storage box 40 comprises a lower panel 52 and a rear panel 55 extending upwardly from the rear edge of the lower panel 52. The lower panel 52 has a pair of downwardly opening grooves 53 defined along its lateral side edges, respectively, and a joint member 54 on its front edge. The lower panel 51 is mounted on the subpipes 7 which are fitted respectively in the grooves 53. An inwardly convex rear fender 56 is formed continuously on the lower and rear panels 52, 55. A seal member 37 is interposed between the rear panel 55 and the seat bottom plate 32.

The front member 61 includes a lower panel 62 and a rearwardly inclined front panel 66 extending from the front edge of the lower panel 62. A joint member 63 extends from the rear edge of the lower panel 62. Side panels 64 extending upwardly from the side edges of the lower panel 62 have respective outwardly extending flanges 65 for engaging the upper rear surface of the main pipes 3, respectively. An engaging member 67 is mounted upwardly on an intermediate portion of the outer surface of the front panel 66. An upper member 68 is mounted upwardly on the upper edge of the front panel 66 for abutting against the front cross plate 8. A battery storage space 70 and an accessory storage space 80 are defined between a front portion of the lower panel 62 and a lower portion of the front panel 66.

The joint member 63 on the rear edge of the lower panel 62 of the front box member 61 is placed on and fastened by screws to the joint member 54 on the front edge of the lower panel 52 of the rear box member 51. The lower panel 62 is supported on the main pipes 3 by the flanges 65. The engaging member 67 on the front panel 66 of the front box member 61 engages in a recess 17 defined in a rear portion of the bottom wall of the air cleaner 16, as shown in FIG. 2.

The helmet storage box 40 has its front portion positioned upwardly of the transmission case 13, rearwardly and downwardly of the fuel tank 18, and forwardly and downwardly of the seat 31. The helmet storage box 40 has an upper rear opening 49 below a lower front surface of the seat bottom plate 32 when the seat 31 is in the lowered position.

As shown in FIG. 2, the opening 49 of the helmet storage box 40 can be opened and closed by the seat 31 to store and remove a full-face crash helmet H, for example, into and out of the helmet storage box 40. The helmet H has its upper front surface inclined rearwardly, and faces in the forward direction when stored in the helmet storage box 40. The front panel 66 of the front member 61 of the helmet storage box 40 is also inclined rearwardly substantially along the rearwardly and upwardly inclined rear wall 18c of the fuel tank 18 in complementary relation to the rearwardly inclined upper front surface of the helmet H.

The helmet storage box 40 also stores a battery B in the battery storage space 70 and an accessory or accessories in the accessory storage space 80.

Figure 6:
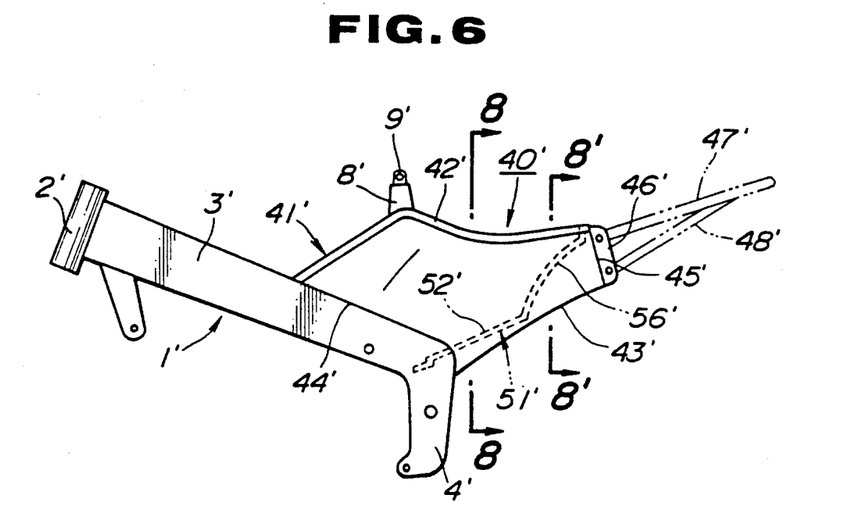
FIG. 6 is a side elevational view of a body frame according to a modification of the first embodiment.
Figure 7:
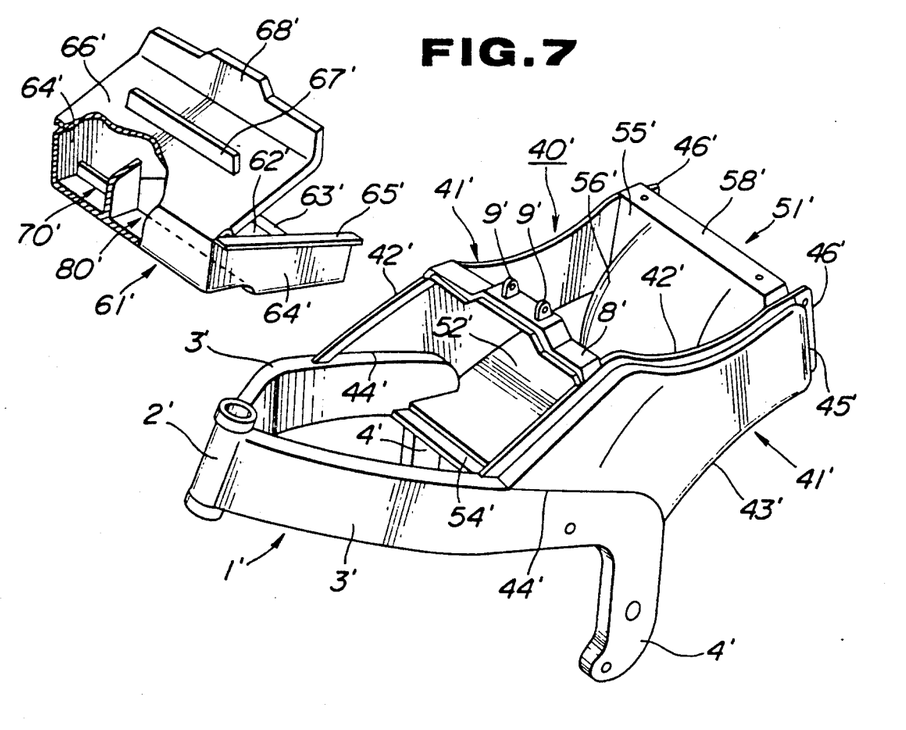
FIG. 7 is an exploded perspective view of the body frame of FIG. 6 and a helmet receptacle.
Figure 8:
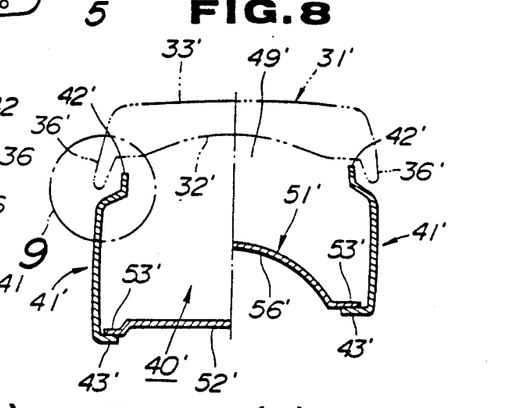
FIG. 8 is a cross-sectional view taken along line 8—8 and line 8'—8' of FIG. 6.

FIGS. 6 through 8 illustrate a motorcycle according to a modification of the first embodiment of the present invention. The motorcycle has a monocoque body frame 1' including a pair of side covers 41' of metal having respective front edges 44' joined to upper rear surfaces of main pipes 3' and upper rear surfaces of central pipes 4', respective lower edges 43' fixedly joined to joint members 53', respectively, on the side edges of a lower panel 52' of a rear box member 51' of metal, and respective rear edges 45' fixedly joined at their inner surfaces to the side edges of a rear panel 55' of the rear box member 51'. A cross plate 8' is joined laterally between intermediate portions of upper edges 42' of the side covers 41, with a pair of laterally spaced pivot shaft support members 9' mounted on the cross plate 8'. The rear panel 55' of the rear box member 51' has an upper edge serving as a cross plate 58'. Rear seat rails 47' and rear subrails 48' have front ends fixed to attachment members 46' mounted on the respective rear edges 45' of the side covers 41'.

A front box member 61' made of synthetic resin includes a lower panel 62' having a joint member 63' on its rear edge, which is placed on and screwed to a joint member 54' on the front edge of the lower panel 52' of the rear box member 51'. An engaging member 67' on an intermediate portion of the outer surface of a front panel 66' of the front box member 61' will engage in a recess defined in a rear portion of the bottom wall of an air cleaner in the same manner as the unmodified version of this embodiment, which is shown in FIG. 2.

The side covers 41' and the rear box member 51' which are of metal and integral with the body frame 1', and the front box member 61' of synthetic resin jointly constitute a helmet storage box 40'. The helmet storage box 40' has a front portion disposed upwardly of a transmission case of an engine, rearwardly and downwardly of a fuel tank, and forwardly and downwardly of a rider's seat 31' in the same manner as the unmodified version of this embodiment, which is shown in FIGS. 1-3. Referring to FIG. 8, the helmet storage box 40' has an upper rear opening 49' below a lower front surface of a seat bottom plate 32'.

Figure 9A:
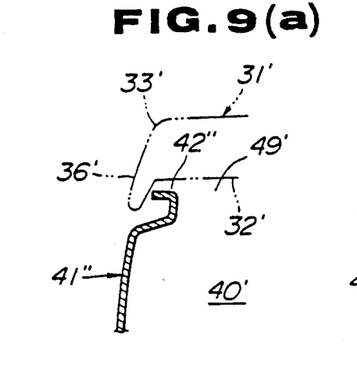
FIGS. 9(a) and 9(b) are enlarged fragmentary cross-sectional views of modifications of a portion encircled at 9 in FIG. 8.
Figure 9B:
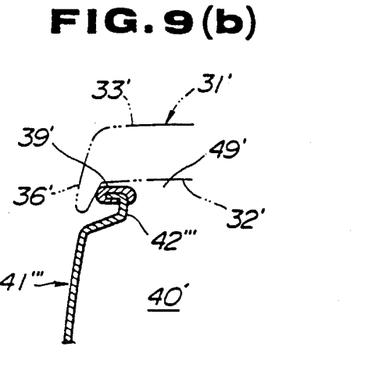

An upper edge 42" of a side cover 41" which is disposed inwardly of a downwardly extending portion 36' of a side of the seat 31' may be in the form of an outwardly opening channel as shown in FIG. 9(a). Alternatively, an elastomeric seal member 39' may be interposed between an upper edge 42'" of a side cover 41'" and the seat bottom plate 32' as shown in FIG. 9(b). With these arrangements, rain water or the like is prevented from entering the box opening 49'.

Figure 10:
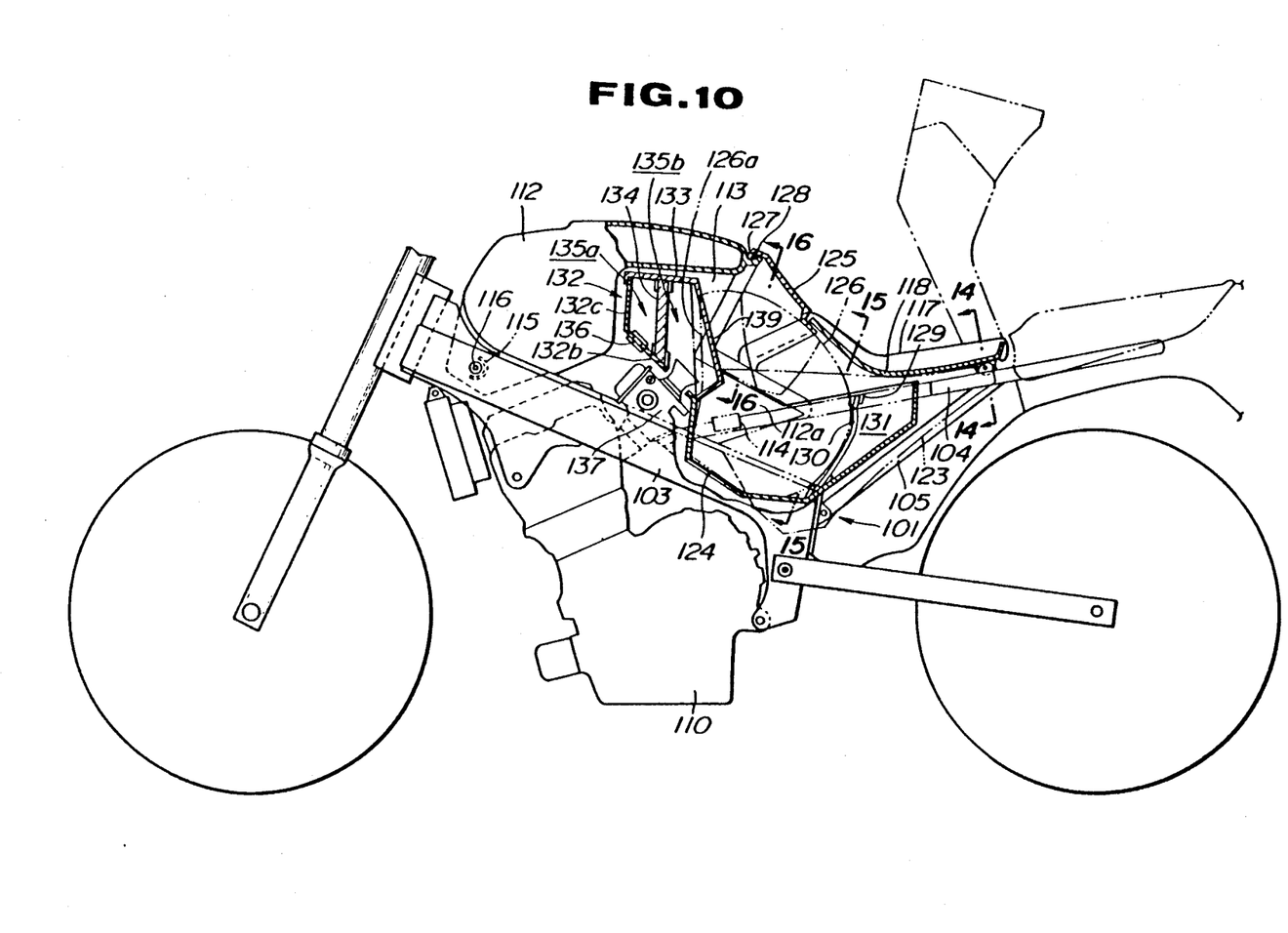
FIG. 10 is a schematic side elevational view, partly in cross-section, of a motorcycle according to a second embodiment of the present invention.
Figure 11:
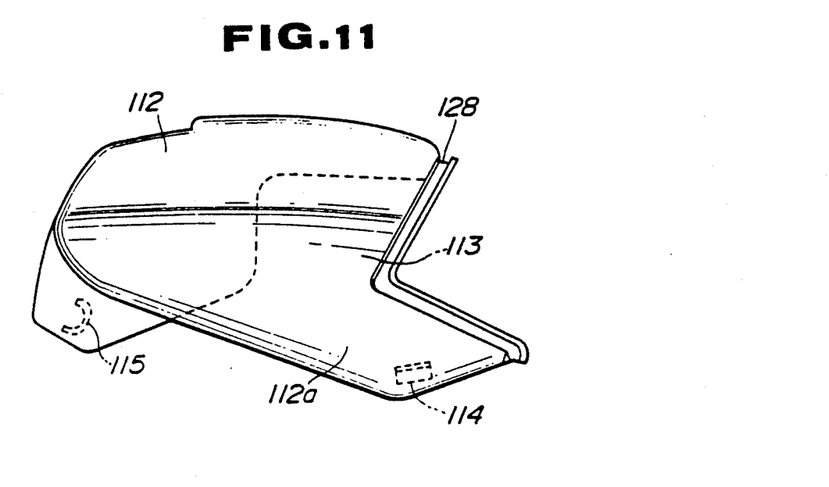
FIG. 11 is a side elevational view of a fuel tank.

FIGS. 10 through 16 show a motorcycle according to a second embodiment of the present invention. As shown in FIGS. 10 and 11, a fuel tank 112 has a recess 113 defined centrally in a rear surface thereof in the transverse direction and extending forwardly, and a pair of arms 112a extending rearwardly and downwardly, one on opposite sides of the recess 113. The arms 112a are attached respectively to a pair of laterally spaced seat pipes 104 by attachment members 114. The fuel tank 112 has a pair of semicircular engaging members 115 mounted on the opposite lower sides of a front end portion thereof. The fuel tank 112 is mounted on a pair of laterally spaced main pipes 103 by the engaging members 115 which engage respective cylindrical shafts 116 projecting from the main pipes 103, respectively.

Figure 14:
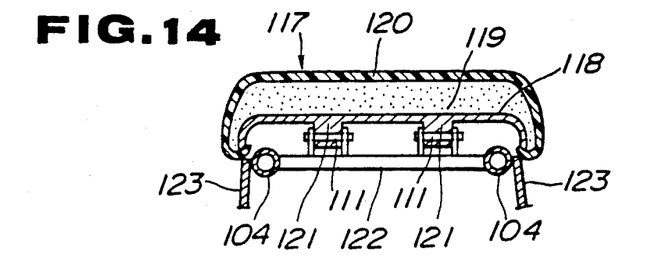
FIG. 14 is a cross-sectional view taken along line 14—14 of FIG. 10.
Figure 15:
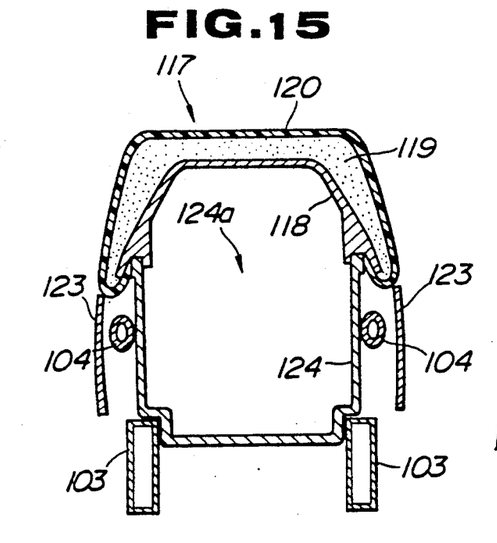
FIG. 15 is a cross-sectional view taken along line 15—15 of FIG. 10.
Figure 16:
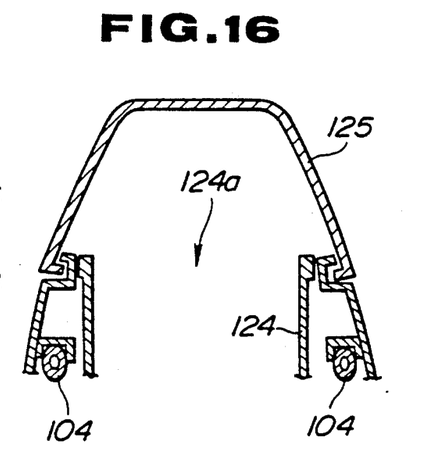
FIG. 16 is a cross-sectional view taken along line 16—16 of FIG. 10.

As shown in FIGS. 14 and 15, a rider's seat 117 includes a rigid bottom plate 118 in the form of a tray opening downwardly, a cushioning member 119 mounted on the bottom plate 118, and a covering 120 placed over the cushioning member 119. As shown in FIG. 14, a pair of attachment members 121 is disposed on a lower surface of the rear end of the seat bottom plate 118 and pivotally mounted on a cross member 122 extending between a pair of laterally spaced seat pipes 104 by means of pins 111. The seat 117 is, therefore, vertically angularly movably supported at its rear end on the seat pipes 104. Outer sides of a motorcycle body frame below the opposite sides of the seat 117 are covered by respective covers 123 having front edges extending adjacent to the rear edges of the arms 112a of the fuel tank 112.

Figure 12:
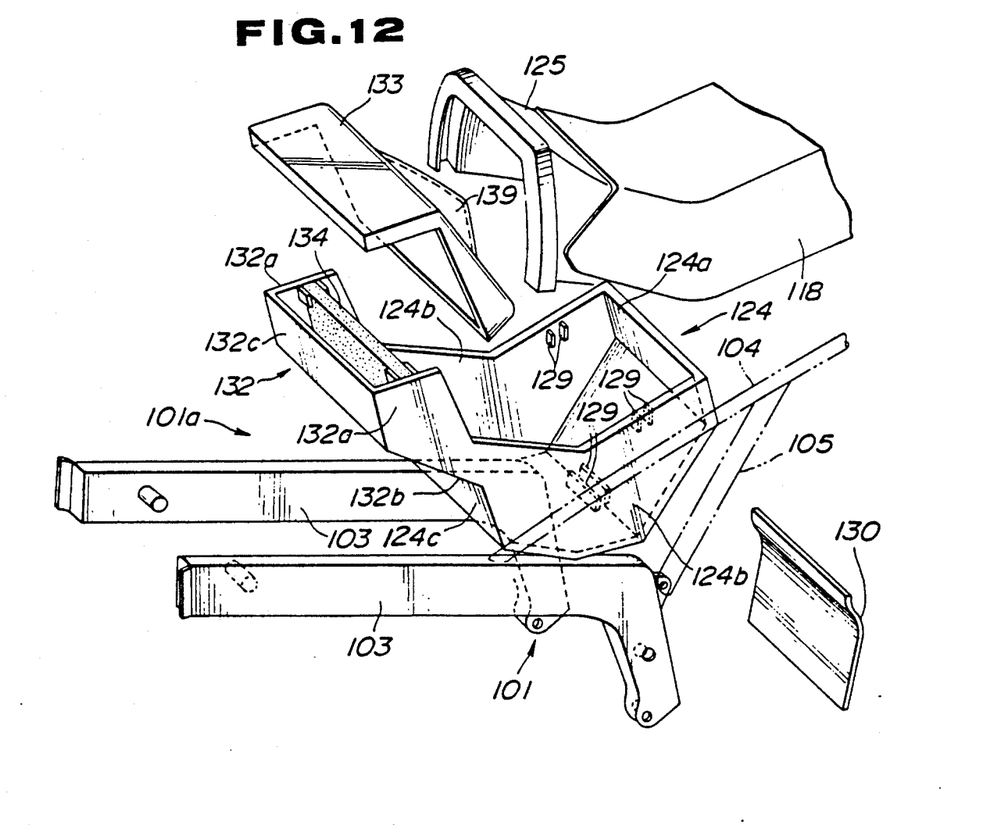
FIG. 12 is an exploded perspective view of a helmet receptacle.

The body frame, designated by 101, has a cavity or space 101a (FIG. 12) defined downwardly between the seat 117 and the fuel tank 112 by the main pipes 103 which are inclined rearwardly and downwardly and the seat pipes 104 which are inclined rearwardly and upwardly. The lateral openings of the space 101a are covered by the arms 112a of the fuel tank 112 and the covers 123. A helmet storage box 124 is disposed in the space 101a. As illustrated in FIGS. 12 and 15, the helmet storage box 124 is fixedly mounted on and lies between the main pipes 103, and has an upper opening 124a which is closed by the bottom plate 118 of the seat 117 and a cover 125 integral with and extending forwardly from the bottom plate 118 when the seat 117 is in its normal position, i.e., the lowered position. The opening 124a of the helmet storage box 124 can thus be opened by angularly moving the seat 117 upwardly about the pins 111 on the rear end thereof for allowing free storage or removal of a helmet 126 or other large items. The cover 125 has an engaging member 127 extending along the front edge thereof. By bringing the engaging member 127 into a groove 128 defined in the rear edge of the fuel tank 112, the cover 125 is engaged by the fuel tank 112, and the upper opening of the helmet storage box 124 is closed by the cover 125 in cooperation with the fuel tank 112 and the seat 117. Pairs of partition attachment members 129 are mounted on inner surfaces of the opposite side walls and bottom wall of the helmet storage box 124. With a partition 130 inserted between the pairs of partition attachment members 129, there is defined a storage space 131 in a rear portion of the helmet storage box 124 for storing another article or articles than the helmet 126.

Figure 13:
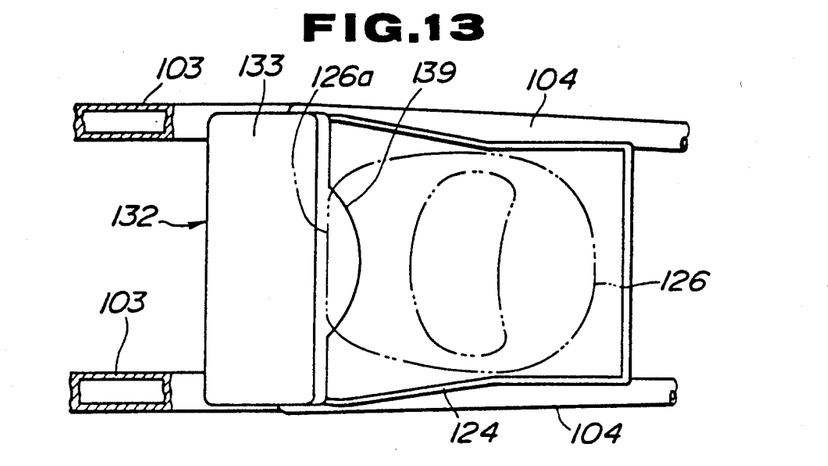
FIG. 13 is a plan view of the helmet receptacle.

An air cleaner case 132 is integrally formed with a front portion of the helmet storage box 124 and positioned in the recess 113 of the fuel tank 112. The air cleaner case 132 comprises a pair of opposite side walls 132a integrally contiguous to respective side walls 124b of the helmet storage box 124, and a bottom wall 132b and a front wall 132c which are integrally contiguous to a front wall 124c of the helmet storage box 124. The helmet storage box 124 and the air cleaner case 132 are molded as a unitary body of synthetic resin. The air cleaner case 132 cooperates with a separate partition 133 in forming a single closed container, the partition 133 being detachably mounted on the air cleaner case 132 to hermetically close upper and rear openings of the air cleaner case 132. The interior space of the air cleaner case 132 is divided into a front chamber 135a and a rear chamber 135b by a cleaner element 134. The front chamber 135a has an air inlet port 136, and the rear chamber 135b is held in communication with an inlet port of an engine 110 through a carburetor 137. Air introduced from the air inlet port 136 into the front chamber 135a is purified by the air cleaner element 134, and then drawn from the rear chamber 135b via the carburetor 137 into the engine 110.

The partition 133 has a positioning bulge 139 for projecting into an opening 126a of the helmet 126 when the helmet 126 is stored in the helmet storage box 124 with the opening 126a being directed forwardly, to thereby position the helmet 126 against wobbling movement.

Since the helmet storage box 124 and the air cleaner case 132 are integrally formed as a unitary construction, the number of parts used is smaller, the number of manufacturing steps required is smaller, and the overall size is smaller, than would be if the helmet storage box and the air cleaner case were separately formed. The helmet storage box 124 and the air cleaner can be disposed in a compact fashion in the space between the seat 117 and the fuel tank 112, thus allowing an excessive space to be available for installing other parts and accessories therein with greater freedom.

The helmet 126 and other articles can be easily stored into and removed from the helmet storage box 124 by lifting the seat 117 about its rear end to open the upper opening of the helmet storage box 124. After the helmet or other articles have been stored, the upper opening of the helmet storage box 124 is fully covered by the seat 117 and the cover 125, and the helmet 126 is stably stored. By lifting the seat 117 and removing the helmet 126, the partition 133 can be easily taken from the air cleaner case 132 into the helmet storage box 124 for permitting easy inspection of the air cleaner in the air cleaner case 132.

Figure 17:
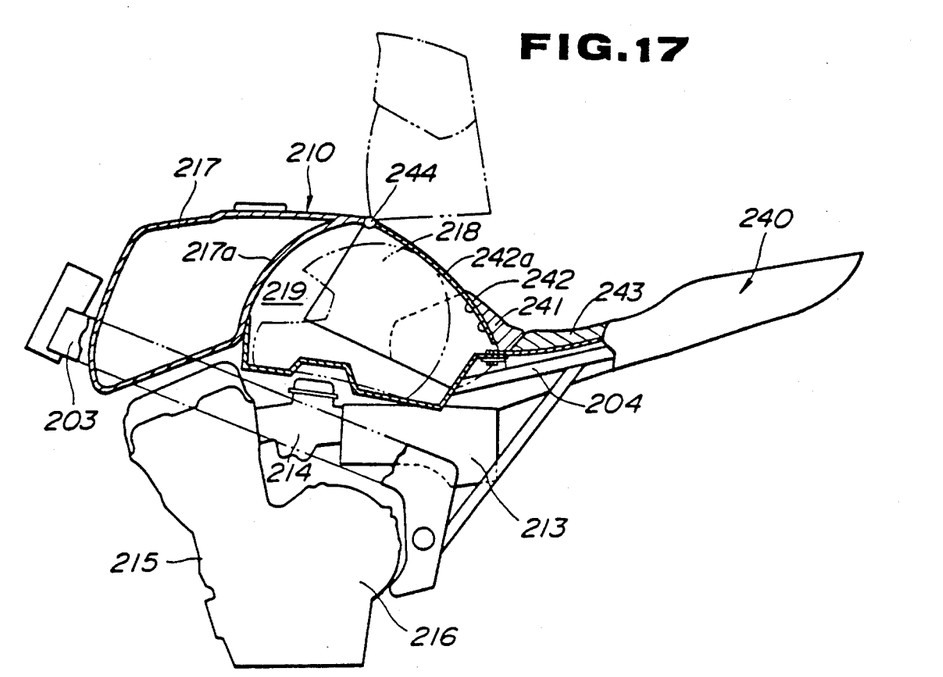
FIG. 17 is a schematic side elevational view, partly in cross section, of a portion of a motorcycle according to a third embodiment of the present invention.

FIG. 17 shows a third embodiment of the present invention. A fuel tank housing 210 is supported on main pipes 203. The fuel tank housing 210 has a front inner space serving as a fuel tank 217 and a rear inner space serving as a storage box 219 for storing a helmet 218, the storage box 219 being divided from the fuel tank 217 by a fuel tank rear wall 217a.

A rider's seat 240 comprises a front portion 241 and a rear portion 243 which are separate from each other. The front seat portion 241 has a bottom plate 242 having an extension 242a extending forwardly and laterally of the front seat portion 241. The extension 242a cooperates with the fuel tank housing 210 in defining the storage box 219. The bottom plate 242 is angularly movably supported at its front end on the fuel tank housing 217 by means of a hinge 244. The bottom plate 242 thus serves as a cover for opening and closing the storage box 219. The rear seat portion 243 has a bottom plate 245 fixed to seat pipes 204. In this embodiment, an air cleaner case 213 and a carburetor 214 are disposed between a transmission case 216 of an engine 215 and the storage box 219 located directly above the transmission case 216.

FIGS. 18 through 22 illustrates a fourth embodiment of the present invention. A large-size storage box 310 is positioned rearwardly and downwardly of a fuel tank 305 and forwardly and downwardly of a rider's seat 313, and fixed to main pipes 303 and subpipes 309. The fuel tank 305, an air cleaner 306, a carburetor 307, and other components are covered with a body cover 311. The body cover 311 has an opening 312 for gaining access into a storage chamber 310a in the storage box 310, the opening 312 extending from the rear end of the fuel tank 305 to the rear end of the cover 311.

Figure 18:
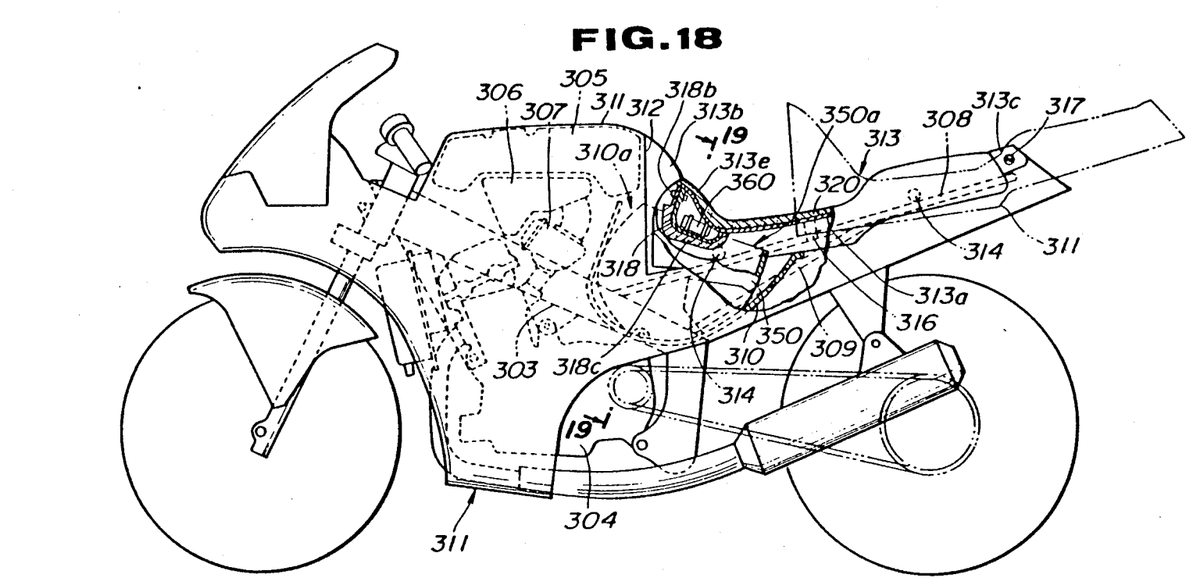
FIG. 18 is a schematic side elevational view, partly in cross section, of a motorcycle according to a fourth embodiment of the present invention.
Figure 20:
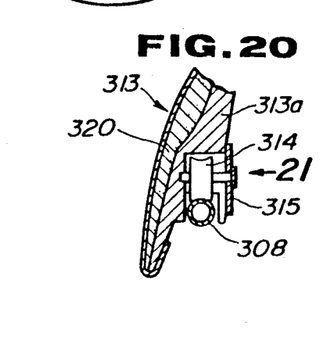
FIG. 20 is a fragmentary cross-sectional view showing a seat pipe and a roller rotatably supported by a seat and rollingly riding on the seat pipe.
Figure 21:
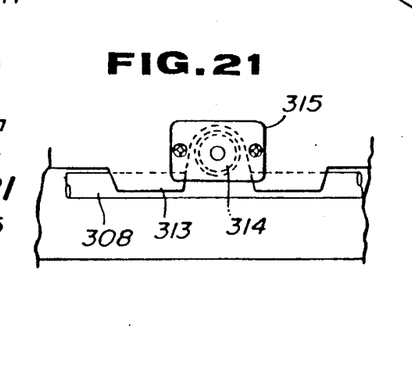
FIG. 21 is a fragmentary side elevational view as viewed in the direction of the arrow 21 in FIG. 20.
Figure 22:
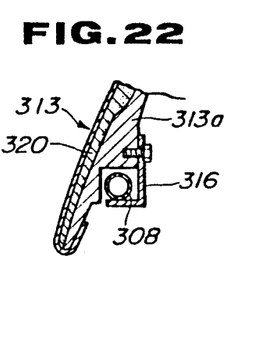
FIG. 22 is a fragmentary cross-sectional view showing the seat pipe and an L-shaped member mounted on the seat.

A rider's seat 313 doubles as a cover for opening and closing the opening 312. The seat 313 comprises a bottom plate 313a, a cushioning member 320 mounted on the bottom plate 313a, and front and rear extensions 313b, 313c integral with the bottom plate 313a and extending forwardly and rearwardly of the cushioning member 320. The extensions 313b, 313c have surfaces lying flush with the surfaces of the cover 311. When the opening 312 is closed by the seat 313, the extensions 313b, 313c look as part of the cover 311. As shown in FIGS. 20 and 21, two front and rear pairs of rollers 314 are rotatably mounted on the bottom plate 313a and bearing plates 315 near the lower ends of the opposite sides of the seat 313. The seat 313 is movably mounted on seat pipes 308 by the rollers 314. L-shaped members 316 are attached to the bottom plate 313a at suitable locations in surrounding relation to the seat pipes 308 for preventing the seat 313 from being derailed from the seat pipes 308. The bottom plate rear extension 313c has a cylinder lock 317 embedded therein for locking the seat 313 to the seat pipes 308 when the seat 313 is in a position to close the opening 312 of the cover 311.

The seat 313 includes a front rising portion 313e having a lower surface to which a shallow small-size storage box 318 is pivotally attached by a hinge 318a. The storage box 318 is detachably coupled to the lower surface of the seat 313 by an engaging member 318b, the storage box 318 serving to store small articles such as gloves, tools, or the like. The storage box 318 has an outer surface covered with a layer of sponge or protective padding 318c.

Figure 19:
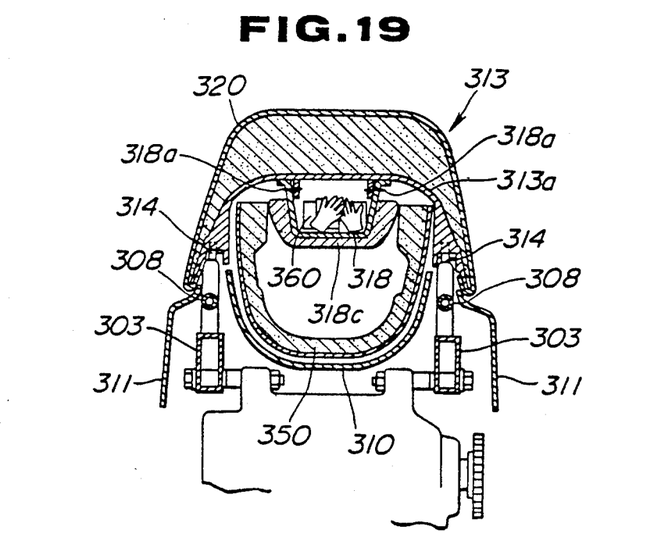
FIG. 19 is a cross-sectional view taken along line 19—19 of FIG. 18.

When the lock 317 is unlocked and the seat 313 is moved back on the seat pipes 308 to open the opening 312, the large-size storage box 310 is opened for allowing a helmet 350 to be stored or removed while the helmet 350 being turned upside down with its opening 350a up. As shown in FIG. 19, when the opening 312 is closed by the seat 313, the small-size storage box 318 enters the helmet 350, thus effectively utilizing the space in the helmet 350. According to alternatives, the small-size storage box 318 may be replaced with a forwardly opening box, and the seat bottom may be directly placed on the seat pipes for sliding movement thereon without employing the rollers 314.

Figure 23:
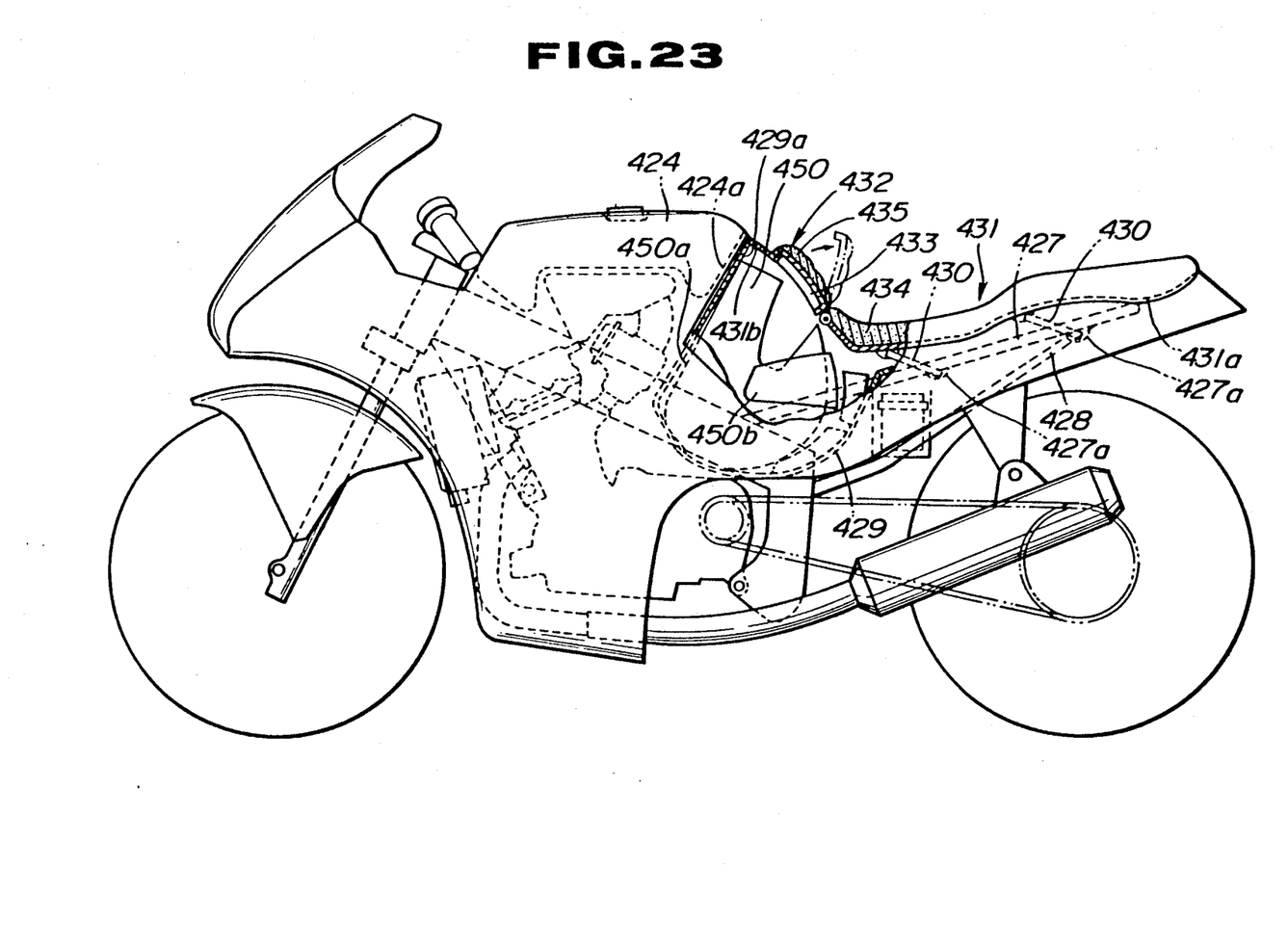
FIG. 23 is a schematic side elevational view, partly in cross-section, of a motorcycle according to a fifth embodiment of the present invention.

A motorcycle 420 according to a fifth embodiment of the present invention is shown in FIG. 23. The motorcycle 420 has a large-size storage box 429 for storing a helmet 450 disposed rearwardly of a fuel tank 424 and forwardly of a rider's seat 431, the storage box 429 having an opening 429a opening rearwardly and upwardly. The seat 431 is operatively coupled to seat pipes 427 by two sets of links 430. The seat 431 comprises a bottom plate 431a, a cushioning member 434 mounted on the bottom plate 431a, and an extension 431b integral with the bottom plate 431a and extending forwardly of the cushioning member 434. The extension 431b has an opening 433 which can be opened and closed by a small cover 432 on which a cushion 435 is mounted.

The links 430 are coupled to the seat bottom plate 431a and the seat pipes 427 at such positions that when the seat 431 is moved forwardly to close the opening 429a of the storage box 429, as shown, the links 430 are inclined forwardly. When the seat 431 is pulled rearwardly while being slightly elevated, the links 430 are turned back and rearwardly inclined about points 427a where the links 430 are pivoted to the seat pipes 427. At this time, the seat 431 is moved backward to open the opening 429a of the storage box 429. The helmet 450 can be stored into the storage box 429 while it is turned upside down, or while its opening 450a is being directed forwardly with a movable windshield vison 450b directed up. With the helmet 450 thus stored, small articles can be taken into and out of the helmet 450 by opening the small cover 432. The cushion 435 of the small cover 432 as it is closed is substantially contiguous to the cushioning member 434 of the seat 431.

In the fourth and fifth embodiments, suitable stoppers are positioned for limiting forward movement of the seats 313, 431, so that the forces applied by the weight of the rider on the seat to move the seat forwardly can be restrained by these stoppers. Grips for moving the seats are mounted on suitable positions on the seats such as side portions or front portions thereof. In these embodiments, the large-size storage box or chamber can fully be opened and closed simply by moving the seat back and forth. Since the seat is vertically moved only a small stroke, the manual effort needed to move the seat may be small, and hence the seat can be handled with ease.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motorcycle comprising:
 a body frame extending in a straight manner substantially along a longitudinal axis of the motorcycle and supporting front and rear wheels on front and rear ends, respectively, thereof;
 a fuel tank disposed near said front end of the body frame and positioned substantially upwardly of said body frame;
 a rider's seat disposed rearwardly of said fuel tank;
 an engine disposed downwardly of said body frame;
 a receptacle adapted to selectively store large sized articles therein and disposed at least partially rearwardly of said fuel tank, at least partially forwardly of said rider's seat, and at least partially upwardly of said engine;
 said receptacle having an opening defined therein, and said rider's seat being movably supported on said motorcycle for selectively covering said opening;
 said body frame comprising at least one main pipe and at least one separate seat supporting member extending rearwardly upwardly from a rear portion of said main pipe such that an intersection defined between said main pipe and said seat supporting member is substantially V-shaped when viewed from the side; and
 said storage receptacle occupying a space defined between said main pipe and said seat supporting member.

2. A motorcycle according to claim 1, wherein said receptacle comprises a storage box for storing a crash helmet therein.

3. A motorcycle according to claim 2, wherein said rider's seat has at least a portion thereof angularly movable about a horizontal axis for opening and closing said receptacle.

4. A motorcycle according to claim 2, wherein said engine comprises a cylinder directed forwardly and a transmission case disposed rearwardly of said cylinder, said receptacle having a front portion positioned directly above said transmission case.

5. A motorcycle according to claim 1, wherein:
 said main pipe supports the front and rear wheels on opposite ends thereof, respectively.

6. A motorcycle according to claim 2, wherein said receptacle includes an air cleaner case integrally formed therewith, and a partition dividing said air cleaner case from an interior space of said receptacle, said air cleaner case being hermetically closed by said partition.

7. A motorcycle comprising:
 a body frame extending in a straight manner substantially along a longitudinal axis of the motorcycle and supporting front and rear wheels on front and rear ends, respectively, thereof;
 a rider's seat supported on a rear portion of said body frame;
 a storage receptacle adapted to selectively store a crash helmet therein;
 said storage receptacle being supported on said body frame at an upper, intermediate portion of said motorcycle and disposed at least partially forwardly of said rider's seat;
 said engine comprising a cylinder directed forwardly and a transmission case disposed rearwardly of said cylinder, said receptacle having at least a portion thereof positioned directly above said transmission case:
 an air cleaner case supported on said body frame;
 said body frame comprising a main pipe and a separate seat supporting member extending rearwardly upwardly from a rear portion of said main pipe such that a substantially V-shaped intersection is defined therebetween; and
 said storage receptacle and said air cleaner case being disposed at said intersection in a space defined between said main pipe and said seat supporting member.

8. A motorcycle according to claim 7, wherein:
 said air cleaner case is accessible through said storage receptacle.

9. A motorcycle according to claim 7, wherein:
 said receptacle has an opening defined therein; and
 said motorcycle further includes means for selectively covering said opening, said covering means including means for preventing a helmet as stored in the storage receptacle from wobbling.

10. A motorcycle according to claim 7, wherein said storage receptacle is centered directly above said transmission case, said motorcycle further comprises a carburetor supported on said engine, and said carburetor and said air cleaner case are disposed between said storage receptacle and said transmission case.

11. A motorcycle according to claim 10, wherein said storage receptacle is disposed entirely above said body frame, and a portion of said air cleaner case is disposed below an upper surface of said body frame.

12. A motorcycle comprising:
 a body frame extending in a straight manner substantially along a longitudinal axis of the motorcycle and supporting front and rear wheels on front and rear ends, respectively, thereof;
 said body frame comprising a main pipe and a separate seat supporting member extending rearwardly upwardly from a rear portion of said main pipe;
 a rider's seat supported on said seat supporting member at a rear portion of the motorcycle;
 an engine disposed downwardly of said body frame, said engine comprising a cylinder directed forwardly and a transmission case disposed rearwardly of said cylinder;
 a storage receptacle adapted to selectively store a crash helmet therein and supported on said body frame forwardly of said seat and above said engine;
 an air cleaner case supported by said body frame below said storage receptacle; and
 said storage receptacle being disposed directly above said transmission case such that a space is defined therebetween and said air cleaner case being disposed in said space.

13. A motorcycle according to claim 12, including a carburetor supported on said engine, and said carburetor and said air cleaner case being disposed in said space between said storage receptacle and said transmission case.

14. A motorcycle according to claim 12, wherein a rear portion of said storage receptacle is covered by a front portion of said seat.

15. A motorcycle according to claim 14, wherein said rider's seat extends from said rear portion of said storage receptacle to substantially a rear end of the motorcycle.

16. A motorcycle according to claim 12, wherein said storage receptacle is disposed entirely above said body frame, and a portion of said air cleaner case is disposed below an upper surface of said body frame.

17. A motorcycle according to claim 16, wherein said storage receptacle is disposed above a portion of said main pipe and above a portion of said seat supporting member.

18. A motorcycle according to claim 13, wherein said storage receptacle is centered directly above said transmission case, and intersecting portions of said main pipe and said seat supporting member are also disposed in said space between said storage receptacle and said transmission case.

* * * * *

UNITED STATES PATENT AND TRADEMARK OFFICE
CERTIFICATE OF CORRECTION

PATENT NO. : 5,172,788
DATED : December 22, 1992
INVENTOR(S) : Fujii et al.

It is certified that error appears in the above-identified patent and that said Letters Patent is hereby corrected as shown below:

Column 1, line 65, after "shown in" insert --Fig. 1;--.

Signed and Sealed this

Nineteenth Day of October, 1993

Attest:

BRUCE LEHMAN

*Attesting Officer*     *Commissioner of Patents and Trademarks*